United States Patent
Hawton et al.

(10) Patent No.: US 10,474,677 B2
(45) Date of Patent: Nov. 12, 2019

(54) RUN-TIME PERFORMANCE OF A DATABASE

(71) Applicant: Embarcadero Technologies, Inc., Austin, TX (US)

(72) Inventors: Brett Hawton, Alamo, CA (US); James B. Pitts, Aptos, CA (US)

(73) Assignee: Embarcadero Technologies, Inc., Austin, TX (US)

( * ) Notice: Subject to any disclaimer, the term of this patent is extended or adjusted under 35 U.S.C. 154(b) by 356 days.

(21) Appl. No.: 14/871,023

(22) Filed: Sep. 30, 2015

(65) Prior Publication Data

US 2017/0091276 A1 Mar. 30, 2017

(51) Int. Cl.
*G06F 16/21* (2019.01)
*G06F 16/2453* (2019.01)

(52) U.S. Cl.
CPC ...... *G06F 16/24549* (2019.01); *G06F 16/217* (2019.01)

(58) Field of Classification Search
CPC .... G06F 17/30289–30294; G06F 11/36–3696; G06F 16/211–212; G06F 16/217
See application file for complete search history.

(56) References Cited

U.S. PATENT DOCUMENTS

| | | | |
|---|---|---|---|
| 6,546,395 B1 * | 4/2003 | DeKimpe | G06F 17/30592 |
| 6,772,411 B2 | 8/2004 | Hayes et al. | |
| 6,859,758 B1 * | 2/2005 | Prabhakaran | G06F 11/3414 |
| | | | 702/186 |
| 7,171,519 B2 | 1/2007 | Huras et al. | |
| 7,403,954 B2 | 7/2008 | Bornhoevd et al. | |
| 7,447,681 B2 | 11/2008 | Lightstone et al. | |
| 7,555,499 B2 | 6/2009 | Shah et al. | |
| 7,562,094 B1 * | 7/2009 | Nadel | G06F 17/30306 |
| 7,809,694 B2 | 10/2010 | Nelson | |
| 7,895,191 B2 | 2/2011 | Colossi et al. | |
| 8,117,146 B2 | 2/2012 | Sankar et al. | |
| 2002/0129035 A1 * | 9/2002 | Hayes | G06F 11/323 |
| 2003/0208481 A1 * | 11/2003 | Neumann | G06F 11/3428 |
| 2004/0215626 A1 * | 10/2004 | Colossi | G06F 17/30312 |
| 2005/0192977 A1 * | 9/2005 | Huras | G06F 11/3409 |
| 2006/0059205 A1 * | 3/2006 | Shah | G06F 11/3476 |
| 2006/0074970 A1 * | 4/2006 | Narayanan | G06F 11/3419 |
| 2006/0085378 A1 * | 4/2006 | Raizman | G06F 17/30312 |
| 2006/0184338 A1 * | 8/2006 | Lightstone | G06F 11/3447 |
| | | | 702/182 |

(Continued)

*Primary Examiner* — Robert W Beausoliel, Jr.
*Assistant Examiner* — Nirav K Khakhar

(57) ABSTRACT

Methods and systems are disclosed improving run-time performance of a database. A non-production database is accessed, at a computer system, during a design phase4 of the non-production database, wherein the non-production database will be converted to a production database after the design phase. Data statistics are generated, at the computer system, based on performance metrics of how the non-production database would perform as the production database. The data statistics are displayed, at the computer system, to a developer of the non-production database during the design phase. At least one suggestion is offered to the developer, at the computer system, to implement into the SQL of the non-production database to improve a performance of the non-production database.

22 Claims, 9 Drawing Sheets

Environment
100

(56) References Cited

U.S. PATENT DOCUMENTS

| | | | |
|---|---|---|---|
| 2006/0212428 A1* | 9/2006 | Nelson | G06F 17/30442 |
| 2007/0078825 A1* | 4/2007 | Bornhoevd | G06F 11/3409 |
| 2007/0136383 A1* | 6/2007 | Steinbach | G06F 17/30306 |
| 2009/0210360 A1* | 8/2009 | Sankar | G06F 9/44505 |
| | | | 706/10 |
| 2010/0005340 A1* | 1/2010 | Belknap | G06F 11/3688 |
| | | | 714/37 |
| 2010/0198809 A1* | 8/2010 | Graefe | G06F 17/30474 |
| | | | 707/713 |
| 2010/0228819 A1* | 9/2010 | Wei | G06F 9/505 |
| | | | 709/203 |
| 2011/0054968 A1* | 3/2011 | Galaviz | G06Q 10/06 |
| | | | 705/7.28 |
| 2013/0007523 A1* | 1/2013 | Unger | G06F 11/3664 |
| | | | 714/32 |
| 2013/0166513 A1* | 6/2013 | Rajaram | G06F 17/30289 |
| | | | 707/687 |
| 2013/0275372 A1* | 10/2013 | Giustra | G06F 17/30306 |
| | | | 707/609 |
| 2014/0280373 A1* | 9/2014 | Raitto | G06F 17/30292 |
| | | | 707/803 |
| 2015/0019197 A1* | 1/2015 | Higginson | G06F 17/5009 |
| | | | 703/22 |
| 2016/0004621 A1* | 1/2016 | Gongloor | G06F 11/3452 |
| | | | 707/688 |

\* cited by examiner

Environment
300

202

SELECT Employee ID,
        LastName
  FROM EmployeeMaster
  WHERE Zip = 94001

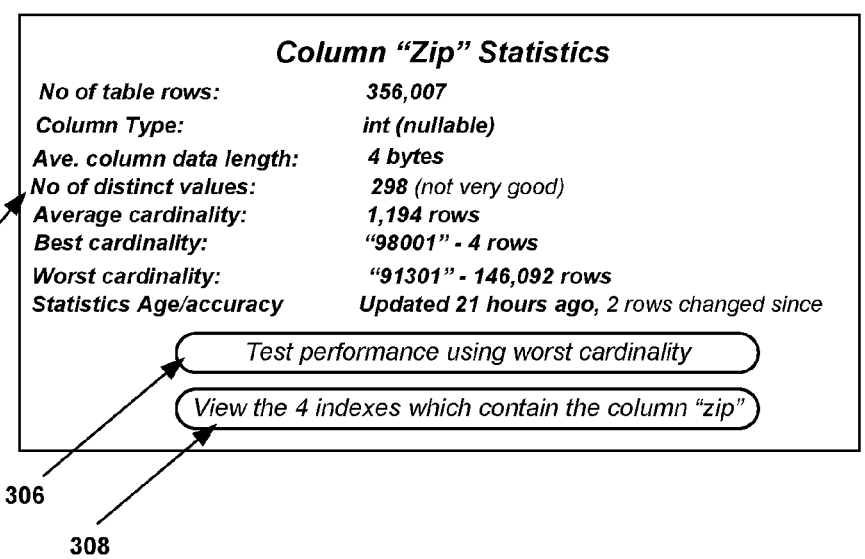

Column "Zip" Statistics

| | |
|---|---|
| No of table rows: | 356,007 |
| Column Type: | int (nullable) |
| Ave. column data length: | 4 bytes |
| No of distinct values: | 298 (not very good) |
| Average cardinality: | 1,194 rows |
| Best cardinality: | "98001" - 4 rows |
| Worst cardinality: | "91301" - 146,092 rows |
| Statistics Age/accuracy | Updated 21 hours ago, 2 rows changed since |

( Test performance using worst cardinality )
( View the 4 indexes which contain the column "zip" )

Environment
400

402

SELECT  Employee ID,
        LastName
FROM  EmployeeMaster
WHERE  Zip = 94001

| *Indexes containing the column "Zip"* | | |
|---|---|---|
| IX Employee Demographics Columns | | |
| Column | Zip | Age |
| Data type | Int (nullable) | Int (nullable) |
| Ave. col data length | 4 bytes | 4 bytes |
| No. of distinct values | 298 (not very good) | 45 (poor) |
| Average cardinality | 1,194 rows | 7,906 rows |
| Best cardinality | "98001" - 4 rows | "62" - 2 rows |
| Worst cardinality | "91301" - 146,092 rows | "28" - 8,522 rows |
| Combined cardinality | 1,194 rows | 26 rows (excellent) |
| *Suggest a new "Covering" index for a better query performance* | | |

Environment
600

602

SELECT MAX(SickLeaveHours+1)
    FROM HumanResources.Employee

Performance Suggestion
Rearranging the highlighted expression as shown below
will increase the performance of this query by 32%.
This query executes 16,322 times per day.
**SELECT MAX(SickLeaveHours) +1
    FROM...**

( Compare plans of existing SQL vs. rearranged SQL )

( Show top 20 performance improvement suggestions )

( Cont change the SQL? We can generate a Plan Guide! )

Process
700

A NON-PRODUCTION DATABASE IS ACCESSED, AT A COMPUTER SYSTEM, DURING A DESIGN PHASE OF THE NON-PRODUCTION DATABASE, WHEREIN THE NON-PRODUCTION DATABASE WILL BE CONVERTED TO A PRODUCTION DATABASE AFTER THE DESIGN PHASE
702

DATA STATISTICS ARE GENERATED, AT THE COMPUTER SYSTEM, BASED ON PERFORMANCE METRICS OF HOW THE NON-PRODUCTION DATABASE WOULD PERFORM AS THE PRODUCTION DATABASE
704

THE DATA STATISTICS ARE DISPLAYED, AT THE COMPUTER SYSTEM, TO A DEVELOPER OF THE NON-PRODUCTION DATABASE DURING THE DESIGN PHASE
706

AT LEAST ONE SUGGESTION IS OFFERED TO THE DEVELOPER, AT THE COMPUTER SYSTEM, TO IMPLEMENT INTO A CODE OF THE NON-PRODUCTION DATABASE TO IMPROVE A PERFORMANCE OF THE NON-PRODUCTION DATABASE
708

FIG. 7

Process
900

A NON-PRODUCTION DATABASE IS ACCESSED, AT A COMPUTER SYSTEM, DURING A DESIGN PHASE OF THE NON-PRODUCTION DATABASE
902

DATA STATISTICS ARE GENERATED, AT THE COMPUTER SYSTEM, BASED ON PERFORMANCE METRICS OF HOW THE NON-PRODUCTION DATABASE BY POINTING THE NON-PRODUCTION DATABASE TO AN EXISTING PRODUCTION DATABASE WITH ACTUAL DATA TO DETERMINE THE PERFORMANCE METRICS
904

THE DATA STATISTICS ARE DISPLAYED, AT THE COMPUTER SYSTEM, TO A DEVELOPER OF THE NON-PRODUCTION DATABASE DURING THE DESIGN PHASE
906

A SUGGESTION IS OFFERED TO THE DEVELOPER, AT THE COMPUTER SYSTEM, TO ADD A NEW COVERING INDEX ASSOCIATED WITH THE NON-PRODUCTION DATABASE
908

FIG. 9

RUN-TIME PERFORMANCE OF A DATABASE

FIELD OF THE TECHNOLOGY

The present technology relates generally to the improvement of run-time performance of the Structured Query Language (SQL) accessing a database.

BACKGROUND

Modern technology relies upon databases to store data for a wide variety of purposes. Databases may be designed, created, or accessed via the SQL syntax in a way that is ineffective or that results in slow performance of the database. A database may be created by a software engineer that has no training or knowledge in database normalization. A software engineer may not have the time or resources necessary to gain adequate skills to optimize the performance of the SQL accessing a database. As a result, databases continue to be created and the data therein manipulated in an ineffective manner.

BRIEF DESCRIPTION OF DRAWINGS

FIG. 3 is a block diagram of an environment for improving run-time performance of a database in accordance with embodiments of the present technology.

FIG. 4 is a block diagram of an environment for improving run-time performance of a database in accordance with embodiments of the present technology.

FIG. 6 is a block diagram of an environment for improving run-time performance of a database in accordance with embodiments of the present technology.

FIG. 7 is a flowchart for improving run-time performance of a database in accordance with embodiments of the present technology.

FIG. 9 is a flowchart for improving run-time performance of a database in accordance with embodiments of the present technology.

Figure 1:
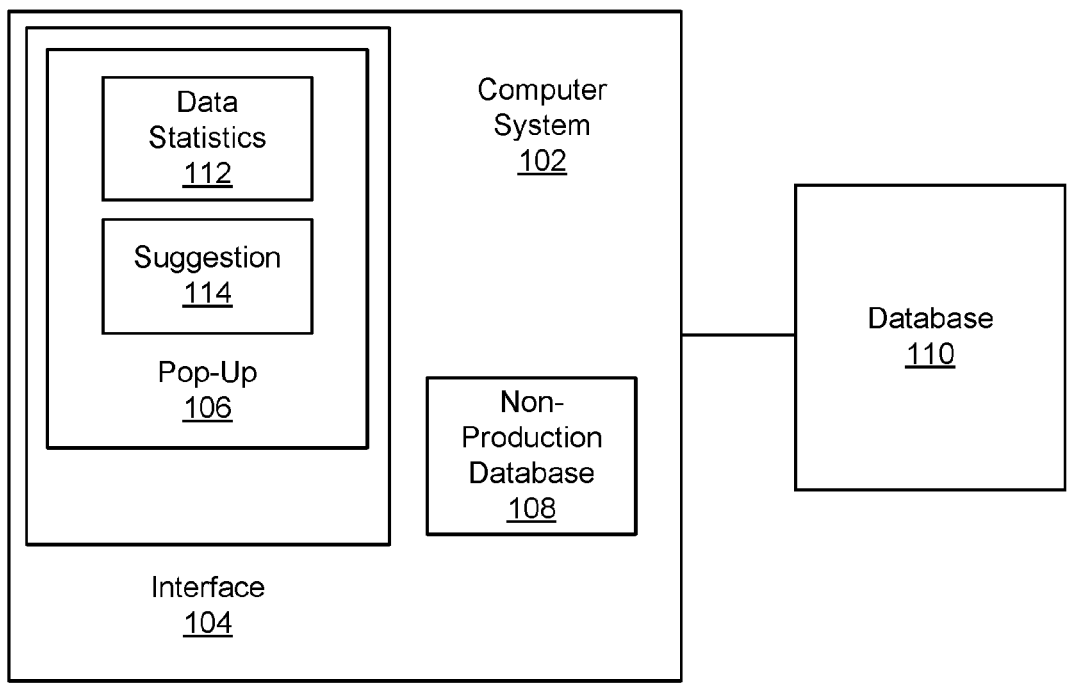
FIG. 1 is a block diagram of an environment for improving run-time performance of a database in accordance with embodiments of the present technology.

The drawings referred to in this description of embodiments should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, user interface controls, and circuits have not been described in detail as not to unnecessarily obscure aspects of the present embodiments.

Unless specifically stated otherwise as apparent from the following discussions, it is appreciated that throughout the present description of embodiments, discussions utilizing terms such as "accessing," "generating," "offering," "changing," "creating," "displaying," "suggesting," "pointing," or the like, refer to the actions and processes of a computer system, or similar electronic computing device. The computer system or similar electronic computing device, such as a smart phone, or handheld mobile device, manipulates and transforms data represented as physical (electronic) quantities within the computer system's registers and memories into other data similarly represented as physical quantities within the computer system memories or registers or other such information storage, transmission, or display devices. Embodiments of the present technology are also well suited to the use of other computer systems such as, for example, optical and mechanical computers.

Overview of Improving Run-Time Performance of a Database

Databases are employed to store large amounts of data. Databases are developed, created, or designed by a developer such as a software engineer. During the design phase or design time of a database, the database may be referred to as a non-production database, a development database, or a design database. The non-production database may not comprise a full set of data compared to production database which may have thousands of columns and millions of rows in production. The production database may also be referred to as a production environment. The non-production database may be designed or developed in such a manner that the Structured Query Language (SQL) accessing it performs well during design time but is not optimized to function optimally with the size or skew of data in the production database and thus may face performance problems when accessing production data which lead the database to be ineffective or slow.

In one embodiment, a database is programmed or coded using SQL. It should be appreciated that the present technology is not limited to SQL but may also be employed using other programming languages or techniques. Database performance problems may result from the quality of the SQL code submitted to them. Prior solutions attempting to solve performance problems have focused on the problem after the fact by showing the worst performing SQL or the SQL causing deadlocks, blocks, etc. after the database has been designed and is in a production environment. Embodiments of the present technology prompt a developer to write better SQL that is optimized for performance during a design phase before the SQL is executed against a production database and for developers to be pro-actively alerted when SQL performance is likely to be suboptimal on the production database.

A developer such as a software engineer is often not trained in database normalization. A software engineer would need to read hundreds of performance articles and books to become an expert in SQL tuning techniques. Software engineers in a design phase of a database don't have time to optimize SQL, especially when the SQL seems to run so well on development or non-production databases where it was written. Even the best written SQL will behave differently when moved from a small non-production database to a production sized database with different data sizes, cardinality, and data skew than that found on the non-production database.

Embodiments of the present technology may be described as SQL Boost and ensures that SQL written by developers is highly performance optimized before its placed in a production environment by tightly integrating with the SQL editor to ensure: best usage of the best performing SQL syntax, its use of existing or new suggested indexes, the size of data seen on production databases, its understanding of data cardinality and data skew, and by helping developers proactively understand where problems may occur. In one embodiment, the optimization that occurs as a result of the present technology is possible because the present technology operates during a design phase of the database code and does not occur in the production environment or after the design phase is complete. In other words, the present technology allows a developer to understand what a query performance will be like against a production database whilst they are still developing the SQL against a development database.

In one embodiment, the present technology generates data statistics or table statistics pertaining to the performance of the SQL code being developed during the design phase. The present technology may point the SQL code at a database different than the non-production database such as at a full production database or other set of data. The SQL code that is in development is then tested to generate performance metrics. For example, a best and worst case scenario of data for a given query may be tested. Such testing may take place in the background and is not entirely transparent to the developer. The results may then be displayed to the developer during the design time such that the developer may be passively assisted by the results to write code for the database.

In one embodiment, the SQL code under development is tested against different sizes of data. Showing SQL developers size & performance statistics helps them make the best query design decisions. In one embodiment, the SQL code under development is tested against cardinality and/or data skew. Cardinality refers to how the data is unique or the uniqueness of the data. Data skew refers to variances in the cardinality of the data such as for example when looking at employee records one may find that in the age column many employees have an age of 25 years (low cardinality/uniqueness) but very few are 72 years (high cardinality/uniqueness). Hence the age column would be considered to have a high degree of data skew. By showing developers the cardinality of the data as well as data skew this enables them to easily test worse case scenarios as well as more normal scenarios. It should be appreciated that embodiments of the present technology may test SQL code under development against any combination of data size, cardinality, and/or data skew, and other performance metrics.

In one embodiment, a database may have existing indexes that may be employed by the non-production database. During the design phase the data statistics may be generated against and show existing indexes. In one embodiment, where there are existing indexes on columns, the present technology allows the developer to view the index(es) in order to understand the index(es)' suitability to the query. This viewing of the index(es) may prompt the developer to make query adjustment and thus improve or optimize the code for the database. In one embodiment, the present technology generates and displays a suggestion related to the index(s). The showing of the index(s) may also show the developer the possible downside of adding an index such as index size and the volatility of the underlying table data as well as per column cardinality and data skew. In one embodiment, the suggestion may be to add a new covering index. The new covering index may be an index that only covers data columns that a query is inquiring after rather than an index which may cover data columns which the query does not access in a database.

Improving Run-Time Performance of a Database

Referring to the figures, exemplary embodiments of the technology will now be described. The following description will focus on embodiments of the present technology comprising methods to improve the run-time performance of SQL on a database by displaying data statistics such as data size, cardinality, data skew, and other pertinent metrics related to the data in tables on a production database to the SQL developer whilst the developer typically creates the SQL on a non-production database.

FIG. 1 is a block diagram illustrating environment 100 which is an example environment comprising computer system 102 for improving run-time performance of a database. It should be appreciated that computer system 102 may be a standard or customized computer system and may be a server, desktop, laptop, tablet, handheld, or other computer system. Computer system 102 may also be a plurality of computers located physically close or remote to one another and may be employed together using cloud computing techniques or server farm techniques. Computer system 102 comprises interface 104, pop-up 106, non-production database 108, data statistics 112, and suggestion 114.

In one embodiment, interface 104 is a graphical interface at computer system 102 for a developer to enter SQL code for non-production database 108. As a developer enters SQL code for non-production database 108, the SQL code is employed or executed against non-production database 108. In one embodiment, non-production database 108 is a development database that is employed only for the testing of the SQL code being written and after the code is finished, the SQL code will be executed with a production database such as database 110. In one embodiment, non-production database 108 is a development database that will be converted to a production database after the SQL code is finished being developed. The SQL code that is developed during the development phase may work well in relation to non-production database 108 but may not be optimized or function well when working with a production database. The present technology offers solutions to test the SQL code being developed while it is being developed to ensure that it is optimized for a production database once completed.

In one embodiment, as the developer creates or develops the SQL code via interface 104 and while so doing the present technology operates as a tool to the developer to unobtrusively to offer suggestions to the developer to creator better SQL code that is well suited to work with a production database as opposed to non-production database 108. In one embodiment, the developer may write a query for non-production database 108. The present technology operates to test such a query against a database or a data set other than non-production database 108. For example, database 110 may be used by the present technology to test a query. It should be appreciated that database 110 may be a full production database or may be a data set that mimics the data in a full production database. Database 110 may be part of computer system 102 or may be located remotely and accessed via a network connection. In one embodiment, the present technology points the code in interface 104 to database 110 to generate data statistics 112.

The query is tested against one or more performance metrics via database 110 to generate data statistics 112. The data statistics indicate to the developer how effective the query will be when executed against a production database. The developer may then change the query based on data statistics 112 to be a more effective query. In one embodiment, the query may be tested against different data criteria including different sizes of data, different data cardinality, and/or different data skew scenarios. A query may be tested against a single data criteria or a combination of data criteria.

Data cardinality refers to how unique a set of data is. For example, the query may be based on data fields for zip codes associated with the address of people listed in the database. In a non-production database the number of zip codes may be small but in a production database the number of entries for zip codes may range in the hundreds of thousands and the number of different types of zip codes entered may be small or large. The data cardinality may be that most fields in a column of a database have very similar or the same data, but a subset of the fields in that same column are populated with different data. Thus a query based on zip code is tested by the present technology against different kinds of data cardinality to generate data statistics 112 to show a developer how effective the query is. The present technology may also make a suggestion to improve the query such as suggestion 114. In one embodiment, suggestion 114 suggests that the query add a combination of data such as zip code and age to give much better cardinality when executing the query against a production database. In one embodiment, data skew refers to uniqueness patterns in the data of a database. An example of data skew may be that 90% of entries in a database are male and only 10% female.

In one embodiment, the data statistics 112 are generated based on best and/or worst case scenarios of data for a given data criteria or combination of data criteria. Best case scenarios may also be referred to as normal scenarios. For example, the present technology may change a data set for a tests scenario where all the data in a column is the same. A worst case scenario may return too many results where the problem is not locating the data but rather is in retrieving or hauling out the large amount of data. The retrieval affects the performance. The database may have one or more indexes in place to aid in locating the data, but the performance would still be degraded by retrieval of too many results.

In one embodiment, the present technology operates to provide information, statistics, alerts, warning, buttons, or other options to a developer in interface 104. The information, other options, etc. may appear in pop-up window in interface 104 such as pop-up 106. Pop-up 106 provides the information to the developer so that the developer can then make decisions or alterations to the code in interface 104 to improve the performance of the database after the code is finished. In one embodiment, pop-up 106 appears passively to assist the developer and not to hinder the developer.

Figure 2:
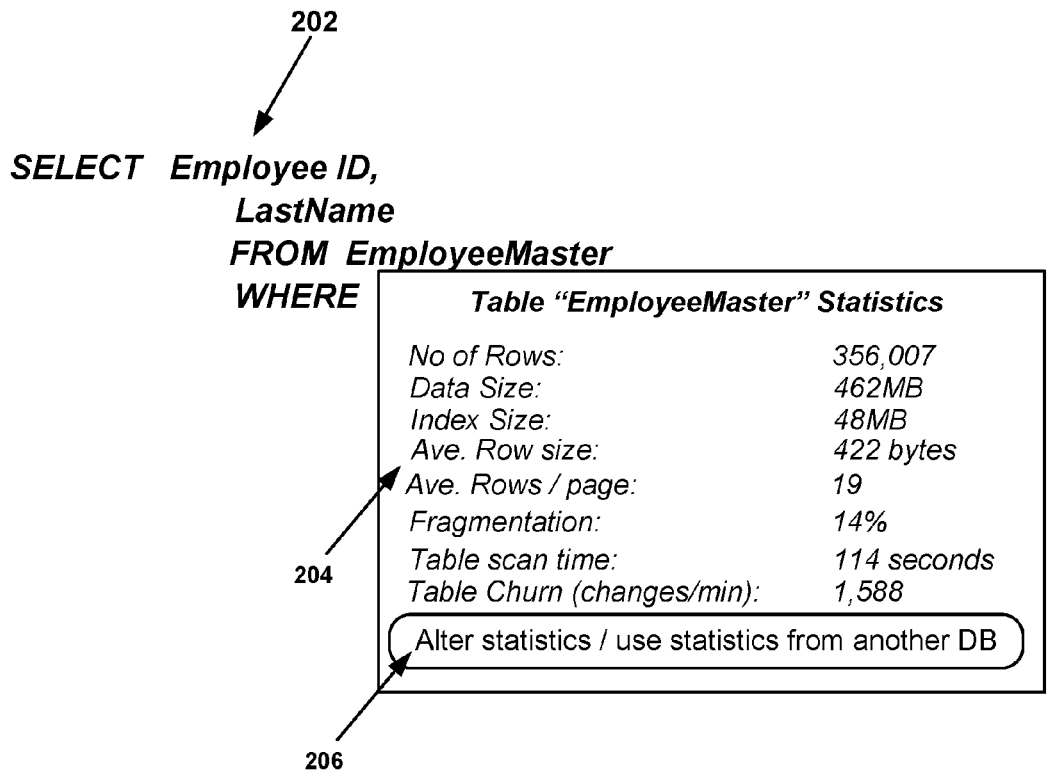
FIG. 2 is a block diagram of an environment for improving run-time performance of a database in accordance with embodiments of the present technology.

FIG. 2 is a block diagram illustrating environment 200 which is an example environment comprising components for improving run-time performance of a database. Query 202 is an example query for a database. The present technology then tests query 202 against a set of data or a production database such as database 110 of FIG. 1 to generate data statistics. Data statistics 204 are an example of data statistics based on the results of the present technology operating on query 202. Suggestion 206 is a suggestion given to the developer based on data statistics 204. In this example the suggestion is to "alter statistics/use statistics from another DB." Data statistics 204 and suggestion 206 are both shown in environment 200 to be displayed in a in a box which may be pop-up 106 of FIG. 1.

FIG. 3 is a block diagram illustrating environment 300 which is an example environment comprising components for improving run-time performance of a database. Query 302 is an example query for a database. The present technology then tests query 302 against a set of data or a production database such as database 110 of FIG. 1 to generate data statistics. Data statistics 304 is an example of data statistics based on the results of the present technology operating on query 302. The data statistics may provide a word value for a given statistic. For example, "No. of distinct values" provides the statistic of 298 along with the word value "(not very good)." The word value provides an indication to the developer of whether or not the query should be changed based on the data statistics 304. The word value may be any number of words such as excellent, good, not very good, poor, etc. The word value may be associated with a percentage. For example, 5% or less may be poor.

In the pop-up window with data statistics 304 is also option 306 and option 308. Option 306 and option 308 given options to the developer in the interface to perform other test or provide more information. For example, option 306 is to "test performance using worst cardinality" and option 308 is to "view the 4 indexes which contain the column 'zip.'"

FIG. 4 is a block diagram illustrating environment 400 which is an example environment comprising components for improving run-time performance of a database. Query 402 is an example query for a database. The present technology then tests query 402 against a set of data or a production database such as database 110 of FIG. 1 to generate data statistics. Data statistics 404 are an example of data statistics based on the results of the present technology operating on query 402. Suggestion 406 is a suggestion given to the developer based on data statistics 404. In this example the suggestion is to "suggest a new 'Covering' index for better query performance." In one embodiment, existing indexes of the database are employed to perform tests and no new or additional indexes are required or suggested. In one embodiment, the present technology determines and suggests that a new index, such as a covering index, should be added to improve performance. A covering index is an index which fully satisfies all of the columns used in the SQL query in that the underlying data rows in the database never has to be accessed. The covering index may be tailored specifically to improve performance of a given query.

Figure 5:
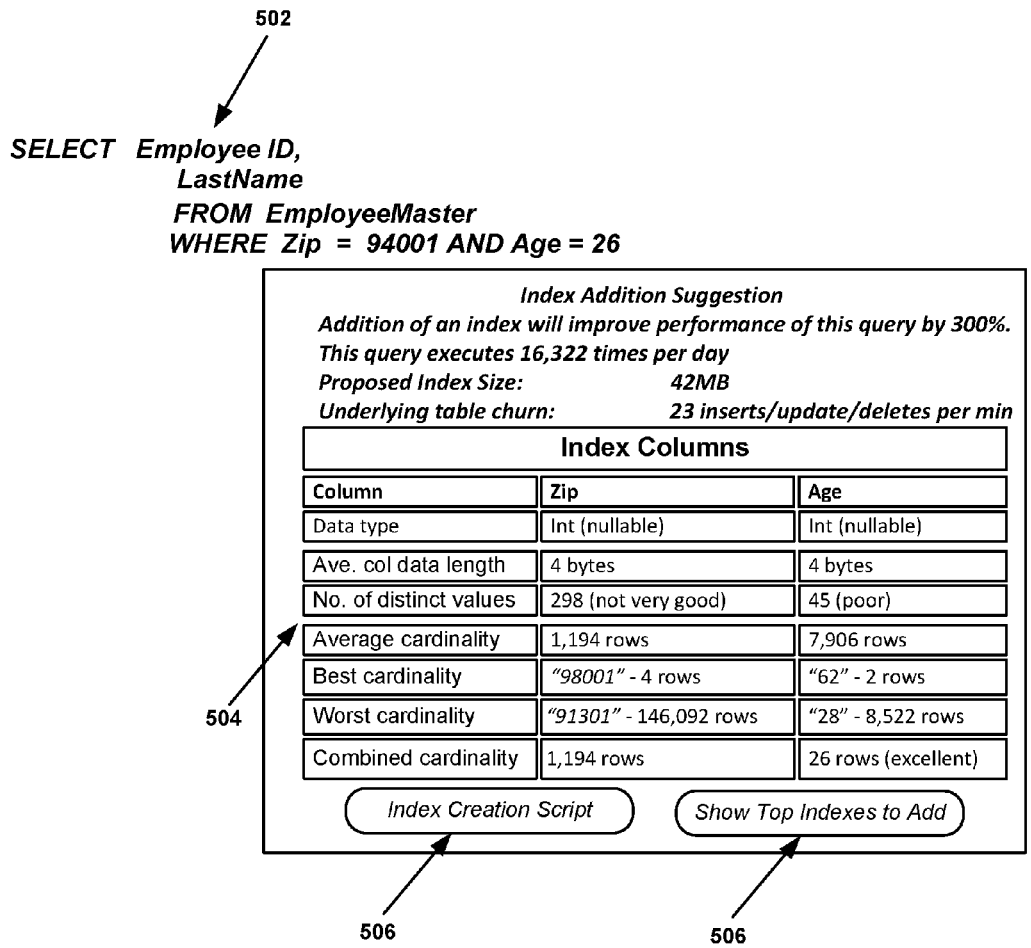
FIG. 5 is a block diagram of an environment for improving run-time performance of a database in accordance with embodiments of the present technology.

FIG. 5 is a block diagram illustrating environment 500 which is an example environment comprising components for improving run-time performance of a database. Query 502 is an example query for a database that comprises a combination of data, zip=94001 and age=26. The present technology then tests query 502 against a set of data or a production database such as database 110 of FIG. 1 to generate data statistics. Data statistics 504 is an example of data statistics based on the results of the present technology operating on query 502. Data statistics 504 provide a word value "excellent" for the cardinality of query 502 that comprises the combination of data with two entries. At the top of data statistics 504 a suggestion is also made for the addition of an index. In the pop-up window with data statistics 504 are also option 506 and option 508. For example, option 506 is for "index creation script" to create an index in accordance with the suggestion and option 508 is to "show top indexes to add."

FIG. 6 is a block diagram illustrating environment 600 which is an example environment comprising components for improving run-time performance of a database. Query 602 is an example query for a database. The present technology then provides data statistics 604 which comprises both data statistics, suggestions, and options to assist the developer.

Operations

FIG. 7 is a flowchart illustrating process 700 for improving run-time performance of a database, in accordance with one embodiment of the present invention. In one embodiment, process 700 is carried out, at least in part, by processors and electrical user interface controls under the control of computer readable and computer executable instructions stored on a computer-usable storage medium. The computer readable and computer executable instructions reside, for example, in data storage features such as computer usable volatile and non-volatile memory and are non-transitory. However, the non-transitory computer readable and computer executable instructions may reside in any type of computer-usable storage medium. In one embodiment, process 700 is performed by devices and databases in FIGS. 1-6.

At 702, a non-production database is accessed, at a computer system, during a design phase of the non-production database, wherein the non-production database will be converted to a production database after the design phase. For example, the non-production database may be non-production database 108 and the computer system may be computer system 102 of FIG. 1. In one embodiment, the production database is database 110 or it may be that the non-production database is the creation of a new production database. The non-production database may comprise code that is programmed using SQL.

At 704, data statistics are generated, at the computer system, based on performance metrics of how the non-production database would perform as the production database. The data statistics may be the data statistics demonstrated in FIGS. 3-6. The data statistics may be generated based on cardinality, data skew, data size, or any combination thereof. The data statistics may be based on best and/or worst case scenarios of the data.

At 706, the data statistics are displayed, at the computer system, to a developer of the non-production database during the design phase. The data statistics may be the data statistics demonstrated in FIGS. 3-6 and may provide numbers as well as word values based on the data statistics. The data statistics may be displayed in a pop-up window in an interface such as pop-up 106 of FIG. 1.

At 708, at least one suggestion is offered to the developer, at the computer system, to implement into a code of the non-production database to improve a performance of the non-production database. In one embodiment, the suggestion suggests a query that employs a combination of a data for index searching. In one embodiment, the suggestion suggests a new covering index for a query.

Figure 8:
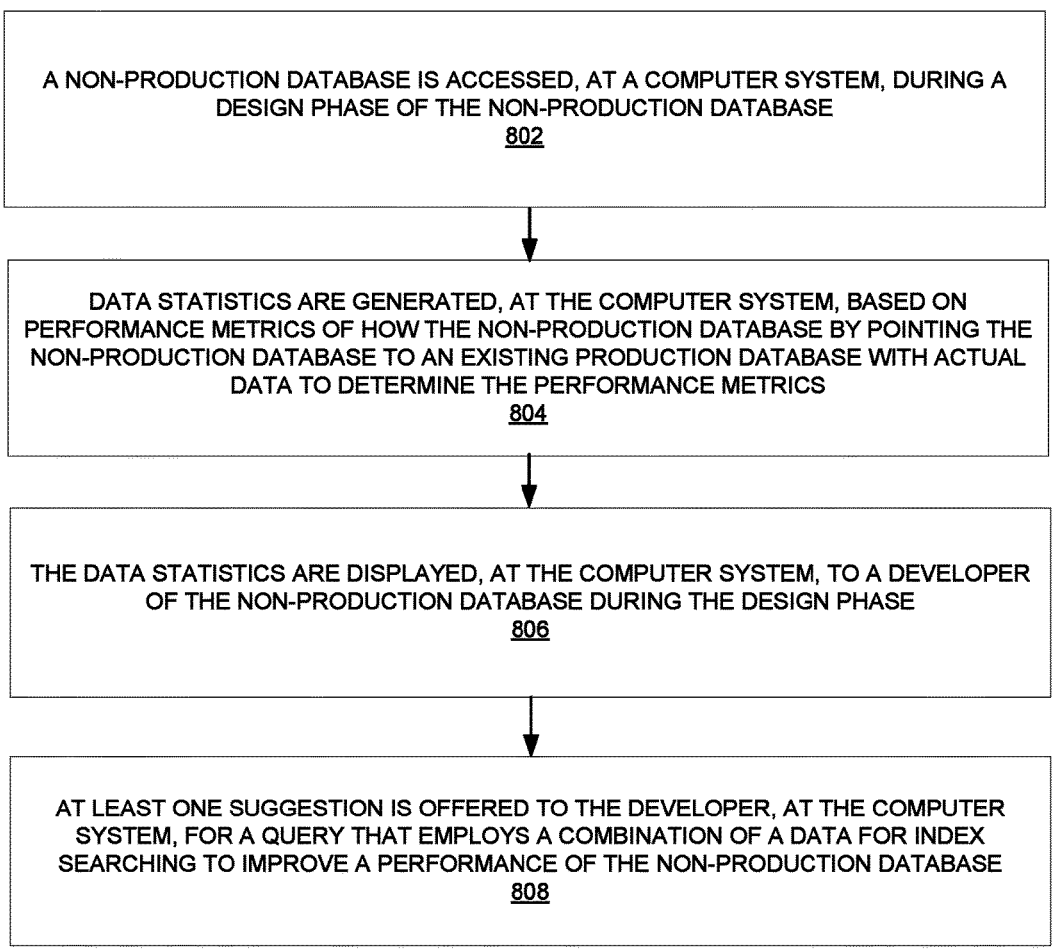
FIG. 8 is a flowchart for improving run-time performance of a database in accordance with embodiments of the present technology.

FIG. 8 is a flowchart illustrating process 800 for improving run-time performance of a database, in accordance with one embodiment of the present invention. In one embodiment, process 800 is carried out, at least in part, by processors and electrical user interface controls under the control of computer readable and computer executable instructions stored on a computer-usable storage medium. The computer readable and computer executable instructions reside, for example, in data storage features such as computer usable volatile and non-volatile memory and are non-transitory. However, the non-transitory computer readable and computer executable instructions may reside in any type of computer-usable storage medium. In one embodiment, process 800 is performed by devices and databases in FIGS. 1-6.

At 802, a non-production database is accessed, at a computer system, during a design phase of the non-production database. For example, the non-production database may be non-production database 108 and the computer system may be computer system 102 of FIG. 1. The non-production database may comprise code that is programmed using SQL.

At 804, data statistics are generated, at the computer system, based on performance metrics of how the non-production database by pointing the non-production database to an existing production database with actual data to determine the performance metrics. The data statistics may be the data statistics demonstrated in FIGS. 3-6. The data statistics may be generated based on cardinality, data skew, data size, or any combination thereof. The data statistics may be based on best and/or worst case scenarios of the data.

At 806, the data statistics are displayed, at the computer system, to a developer of the non-production database during the design phase. The data statistics may be the data statistics demonstrated in FIGS. 3-6 and may provide numbers as well as word values based on the data statistics. The data statistics may be displayed in a pop-up window in an interface such as pop-up 106 of FIG. 1.

At 808, at least one suggestion is offered to the developer, at the computer system, for a query that employs a combination of a data for index searching to improve a performance of the non-production database. In one embodiment, the suggestion also suggests a new covering index for a query.

FIG. 9 is a flowchart illustrating process 900 for improving run-time performance of a database, in accordance with one embodiment of the present invention. In one embodiment, process 900 is carried out, at least in part, by processors and electrical user interface controls under the control of computer readable and computer executable instructions stored on a computer-usable storage medium. The computer readable and computer executable instructions reside, for example, in data storage features such as computer usable volatile and non-volatile memory and are non-transitory. However, the non-transitory computer readable and computer executable instructions may reside in any type of computer-usable storage medium. In one embodiment, process 900 is performed by devices and databases in FIGS. 1-6.

At 902, a non-production database is accessed, at a computer system, during a design phase of the non-production database. For example, the non-production database may be non-production database 108 and the computer system may be computer system 102 of FIG. 1. The non-production database may comprise code that is programmed using SQL.

At 904, data statistics are generated, at the computer system, based on performance metrics of how the non-production database by pointing the non-production database to an existing production database with actual data to determine the performance metrics. The data statistics may be the data statistics demonstrated in FIGS. 3-6. The data statistics may be generated based on cardinality, data skew, data size, or any combination thereof. The data statistics may be based on best and/or worst case scenarios of the data.

At 906, the data statistics are displayed, at the computer system, to a developer of the non-production database during the design phase. The data statistics may be the data statistics demonstrated in FIGS. 3-6 and may provide numbers as well as word values based on the data statistics. The data statistics may be displayed in a pop-up window in an interface such as pop-up 106 of FIG. 1.

At 908, a suggestion is offered to the developer, at the computer system, to add a new covering index associated with the non-production database. In one embodiment, the suggestion also suggests a query that employs a combination of a data for index searching.

Example Computer System Environment

The present technology may be carried out, associated with or otherwise practiced with a computer system. Portions of the present technology are composed of computer-readable and computer-executable instructions that reside, for example, in computer-usable media of a computer system or other user device such as computer system 102 and/or database 110 of FIG. 1. Described below is an example computer system or components that may be used for or in conjunction with aspects of the present technology such as a method for improving run-time performance of a database.

It is appreciated that that the present technology can operate on or within a number of different computer systems including general purpose networked computer systems, embedded computer systems, a personal computer such as a desktop computer, a laptop, a notebook, an electronic handheld device, a personal digital assistant, a smart phone, a tablet computer, a net book, user devices, and the like. The computer system is well adapted to having peripheral computer readable media such as, for example, a floppy disk, a compact disc, flash memory and the like coupled thereto.

The computer system includes an address/data bus for communicating information, and a processor coupled to bus for processing information and instructions. The computer system is also well suited to a multi-processor or single processor environment and also includes data storage features such as a computer usable volatile memory, e.g. random access memory (RAM), coupled to bus for storing information and instructions for processor(s).

The computer system may also include computer usable non-volatile memory, e.g. read only memory (ROM), as well as input devices such as an alpha-numeric input device, a mouse, or other commonly used input devices. The computer system may also include a display such as liquid crystal device, cathode ray tube, plasma display, and other output components such as a printer or other common output devices.

The computer system may also include one or more signal generating and receiving device(s) coupled with a bus for enabling the system to interface with other electronic devices and computer systems. Signal generating and receiving device(s) of the present embodiment may include wired serial adaptors, modems, and network adaptors, wireless modems, and wireless network adaptors, and other such communication technology. The signal generating and receiving device(s) may work in conjunction with one or more communication interface(s) for coupling information to and/or from the computer system. A communication interface may include a serial port, parallel port, Universal Serial Bus (USB), Ethernet port, antenna, or other input/output interface. A communication interface may physically, electrically, optically, or wirelessly (e.g. via radio frequency) couple the computer system with another device, such as a cellular telephone, radio, a handheld device, a smart phone, or computer system.

Although the subject matter is described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for improving run-time performance of a database, said method comprising:
   accessing a non-production database, at a computer system, during a design phase of said non-production database, wherein said non-production database will be converted to a production database after said design phase, said non-production database comprising code;
   testing said code of said non-production database against an existing production database, said testing said code comprising:
     testing a query written for said non-production database against said production database, wherein said query is tested against performance metrics of said production database;
   generating data statistics, at said computer system, based on said testing said code, said data statistics based on said performance metrics of how said non-production database would perform as said production database;
   displaying said data statistics, at said computer system, to a developer of said non-production database during said design phase; and
   offering at least one suggestion to said developer, at said computer system, to implement into a code of said non-production database to improve a performance of said non-production database.

2. The method as recited in claim 1 wherein said non-production database comprises structured query language (SQL).

3. The method as recited in claim 1 wherein said generating said data statistics points said non-production database to an existing production database with actual data to determine said performance metrics.

4. The method as recited in claim 1 wherein said data statistics and said performance metrics are based on a cardinality of data.

5. The method as recited in claim 1 wherein said data statistics and said performance metrics are based on a data skew of data.

6. The method as recited in claim 1 wherein said data statistics and said performance metrics are based on a size of a data set.

7. The method as recited in claim 1 wherein said performance metrics test a best case scenario and a worst case scenario.

8. The method as recited in claim 1 wherein said displaying said data statistics and said offering said at least one suggestion occur in a pop-up window in an interface used for said design phase.

9. The method as recited in claim 1 wherein said offering said at least one suggestion suggests a query that employs a combination of a data for index searching.

10. The method as recited in claim 1 wherein said offering said at least one suggestion suggests a new covering index for a query.

11. A non-transitory computer readable storage medium having instructions embodied therein that when executed cause a computer system to perform a method for improving run-time performance of a database, said method comprising:

accessing a non-production database, at a computer system, during a design phase of said non-production database, said non-production database comprising code;

testing said code of said non-production database against an existing production database with actual data, said testing said code comprising:

testing a query written for said non-production database against said production database, wherein said query is tested against performance metrics of said production database;

generating data statistics, at said computer system, based on said testing said code, said data statistics based on said performance metrics of how said non-production database would perform as a production database by pointing said non-production database to said existing production database with said actual data to determine said performance metrics;

displaying said data statistics, at said computer system, to a developer of said non-production database during said design phase; and offering at least one suggestion to said developer, at said computer system, for a query that employs a combination of a data for index searching to improve a performance of said non-production database.

12. The non-transitory computer readable storage medium as recited in claim 11 wherein said non-production database comprises structured query language (SQL).

13. The non-transitory computer readable storage medium as recited in claim 11 wherein said data statistics and said performance metrics are based on a cardinality of data.

14. The non-transitory computer readable storage medium as recited in claim 11 wherein said data statistics and said performance metrics are based on a data skew of data.

15. The non-transitory computer readable storage medium as recited in claim 11 wherein said data statistics and said performance metrics are based on a size of data.

16. The non-transitory computer readable storage medium as recited in claim 11 wherein said offering said at least one suggestion further suggests a new covering index for a query.

17. A method for improving run-time performance of a database, said method comprising:

accessing a non-production database, at a computer system, during a design phase of said non-production database, said non-production database comprising code;

testing said code of said non-production database against an existing production database with actual data, said testing said code comprising:

testing a query written for said non-production database against said production database, wherein said query is tested against performance metrics of said production database;

generating data statistics, at said computer system, based on said testing said code, said data statistics based on said performance metrics of how said non-production database would perform as a production database by pointing said non-production database to said existing production database with said actual data to determine said performance metrics;

displaying said data statistics, at said computer system, to a developer of said non-production database during said design phase; and offering a suggestion to said developer, at said computer system, to add a new covering index associated with said non-production database.

18. The method as recited in claim 17 wherein said non-production database comprises structured query language (SQL).

19. The method as recited in claim 17 wherein said data statistics and said performance metrics are based on a cardinality of data.

20. The method as recited in claim 17 wherein said data statistics and said performance metrics are based on a data skew of data.

21. The method as recited in claim 17 wherein said data statistics and said performance metrics are based on a size of a data set.

22. The method as recited in claim 17 wherein said offering said suggestion further suggests a query that employs a combination of a data for index searching.

* * * * *